US007188558B2

(12) United States Patent
Brede et al.

(10) Patent No.: US 7,188,558 B2
(45) Date of Patent: Mar. 13, 2007

(54) PYROMECHANICAL SEPARATING ELEMENT

(75) Inventors: Uwe Brede, Fuerth (DE); Horst Lancht, Bruckmuhl (DE)

(73) Assignee: Delphi Technologies, Inc, Troy, MI (US)

( * ) Notice: Subject to any disclaimer, the term of this patent is extended or adjusted under 35 U.S.C. 154(b) by 212 days.

(21) Appl. No.: 10/767,173

(22) Filed: Jan. 30, 2004

(65) Prior Publication Data

US 2004/0255811 A1 Dec. 23, 2004

(51) Int. Cl.
*B64D 1/04* (2006.01)

(52) U.S. Cl. ................. 89/1.14; 244/172.6; 244/173.3; 102/335; 102/347; 102/378; 411/390; 411/391

(58) Field of Classification Search ................. 89/1.14, 89/1.13; 60/625, 635; 244/172.6, 173.3; 102/347, 378, 335; 411/390, 391
See application file for complete search history.

(56) References Cited

U.S. PATENT DOCUMENTS

| | | | | | |
|---|---|---|---|---|---|
| 2,489,984 | A | * | 11/1949 | Shoemaker | 244/1 R |
| 2,585,870 | A | * | 2/1952 | Spielman | 89/1.57 |
| 2,809,584 | A | * | 10/1957 | Smith | 102/378 |
| 2,815,008 | A | * | 12/1957 | Hirt | 60/638 |
| 2,897,799 | A | * | 8/1959 | Stupian | 60/636 |
| 2,959,129 | A | * | 11/1960 | Warren | 403/31 |
| 3,072,168 | A | * | 1/1963 | Beart | 411/165 |
| 3,084,597 | A | * | 4/1963 | Beyer | 89/1.14 |
| 3,111,808 | A | * | 11/1963 | Fritz | 60/635 |
| 3,119,298 | A | * | 1/1964 | Brown | 411/440 |
| 3,199,288 | A | * | 8/1965 | Nahas | 60/635 |
| 3,234,727 | A | * | 2/1966 | Filer | 60/632 |
| 3,244,104 | A | * | 4/1966 | Mills et al. | 102/378 |
| 3,546,999 | A | * | 12/1970 | Hosang | 89/1.14 |
| 3,661,084 | A | * | 5/1972 | Noles | 89/1.14 |
| 3,888,085 | A | * | 6/1975 | Larsonneur | 60/635 |
| 3,902,400 | A | * | 9/1975 | Kincheloe et al. | 89/1.14 |
| 3,903,803 | A | * | 9/1975 | Losey | 102/378 |
| 4,002,120 | A | * | 1/1977 | Swales et al. | 102/378 |
| 4,091,621 | A | | 5/1978 | Patrichi | |
| 4,158,322 | A | * | 6/1979 | Hardesty | 89/1.14 |
| 4,237,690 | A | * | 12/1980 | Tsuge et al. | 60/635 |
| 4,244,386 | A | * | 1/1981 | Hardesty | 137/68.13 |
| 4,412,420 | A | * | 11/1983 | Patrichi et al. | 60/635 |
| 4,608,926 | A | * | 9/1986 | Stevens | 102/275.4 |
| 4,612,857 | A | * | 9/1986 | Schimmel | 102/204 |
| 4,671,715 | A | * | 6/1987 | Berg | 411/8 |
| 4,685,376 | A | * | 8/1987 | Noel et al. | 89/1.14 |

(Continued)

FOREIGN PATENT DOCUMENTS

| | | |
|---|---|---|
| DE | 4326737 | 3/1994 |

(Continued)

*Primary Examiner*—J. Woodrow Eldred
(74) *Attorney, Agent, or Firm*—Jimmy L. Funke

(57) ABSTRACT

The invention relates to a pyromechanical separating element having a hermetically sealed pyrotechnic pressure element (2), which is installed in a housing (1) and has a gas-forming pyrotechnic charge, and a detachable latching pin (5) which is separated from the pressure element (2) by a driving volume (19) and is inserted into the housing (1), wherein a first securing point is arranged on the housing (1) and a second securing point is arranged on the latching pin (5), and the latching pin (5) is anchored on the housing (1) by way of an arresting and force-limiting element (8).

11 Claims, 4 Drawing Sheets

U.S. PATENT DOCUMENTS

| | | | | | |
|---|---|---|---|---|---|
| 4,860,698 | A | | 8/1989 | Patrichi | |
| 5,129,306 | A | * | 7/1992 | Fauvel | 89/1.14 |
| 5,370,343 | A | * | 12/1994 | Hornyak | 244/171.1 |
| 5,519,997 | A | * | 5/1996 | Specht | 60/632 |
| 5,566,909 | A | * | 10/1996 | Lapins | 244/173.3 |
| 5,579,636 | A | * | 12/1996 | Rosenfield | 60/251 |
| 5,613,706 | A | * | 3/1997 | Parker et al. | 280/741 |
| 5,695,306 | A | * | 12/1997 | Nygren, Jr. | 411/433 |
| 6,076,467 | A | * | 6/2000 | Cespedosa et al. | 102/378 |
| 6,269,748 | B1 | * | 8/2001 | Rudoy et al. | 102/377 |
| 6,290,182 | B1 | * | 9/2001 | Grunditz | 244/173.1 |
| 6,397,595 | B2 | * | 6/2002 | Benoit et al. | 60/512 |
| 6,403,873 | B1 | * | 6/2002 | Amaral et al. | 114/22 |
| 6,568,184 | B2 | * | 5/2003 | Blackburn et al. | 60/636 |
| 6,655,143 | B2 | * | 12/2003 | Daunas | 60/635 |
| 6,662,702 | B1 | * | 12/2003 | Vidot et al. | 89/1.14 |
| 6,675,692 | B1 | * | 1/2004 | Goetz | 89/1.14 |
| 6,851,372 | B2 | * | 2/2005 | Bender et al. | 102/530 |
| 6,851,373 | B2 | * | 2/2005 | Quioc | 102/530 |
| 6,925,939 | B2 | * | 8/2005 | Cleveland | 102/378 |
| 2003/0196544 | A1 | * | 10/2003 | Comtesse | 89/1.14 |
| 2004/0007123 | A1 | * | 1/2004 | Ritchie et al. | 89/1.14 |
| 2005/0084364 | A1 | * | 4/2005 | Tuszynski | 411/432 |

FOREIGN PATENT DOCUMENTS

| | | |
|---|---|---|
| DE | 19922674 | 11/2000 |
| DE | 10203710 | 2/2003 |
| EP | 1162333 | 12/2001 |

* cited by examiner

PYROMECHANICAL SEPARATING ELEMENT

The invention relates to a pyromechanical separating element.

Separating elements which are driven by pyrotechnic fuels are known that are mostly constructed in the form of screws and are provided with a gas-forming charge in a specially formed hollow space. An ignition element, which can be triggered electrically or mechanically, as and when required ignites this pyrotechnic substance that generates a very high pressure and tears the screw apart at a certain pre-weakened predetermined breaking point. The problems with these screws exist as a rule during normal operation during which mechanical assemblies are to be held together with a certain holding force. As a result of temperature-expansion/contraction processes and alternating mechanical loads, as a rule these predetermined breaking points represent an unintentional weakening for long-term operation. This problem is solved in that the thickness of the rest of the wall of the predetermined breaking point is over-dimensioned. The consequence of this in turn, however, is that very high pressures are required for the separation. However, there are many applications in which separating elements are merely to hold two components together and the normal operating forces are not very high. In the case of separating screws with predetermined breaking points that are incorporated therein, the ignition elements and the charges must also be installed so that they oppose the high pressure in such a way that the ignition mechanism is not centrifuged out during the separating process.

The underlying object of the invention is to develop a pyromechanical separating element which allows the separating force to be set in the case of intentional triggering in a manner defined in accordance with the task and which at the same time consists of a small number of individual parts. In accordance with the invention this object is achieved by means of the features of claim 1. An important feature is the use of already hermetically sealed pyrotechnic pressure elements, and the introduction of a special construction element which allows the separating force to be set in the case of intentional triggering in a manner defined in accordance with the task. This construction element is, in accordance with the invention, an arresting and force-limiting element with which the latching pin is anchored on the housing.

In a preferred embodiment, the arresting and force-limiting element is a plate spring with preferably crown-shaped incisions which in the latched state sits both in a latching-pin groove in the latching pin and in a housing groove.

Alternatively, the arresting and force-limiting element can also be a sheet-metal ring or a spring ring which in the latched state sits both in a latching-pin groove and in a housing groove.

In another embodiment, the arresting and force-limiting element is a radial projection on the latching pin that engages into a housing groove on the housing.

Advantageously, arranged on the outer circumference of the latching pin there is a sealing ring which is let into a groove.

Further features of the invention emerge from the figures which are described in the following and in which:

FIG. 1 shows the pyromechanical separating element in accordance with the invention that is installed in a tube clip which is to be released if the need arises.

Figure 1:
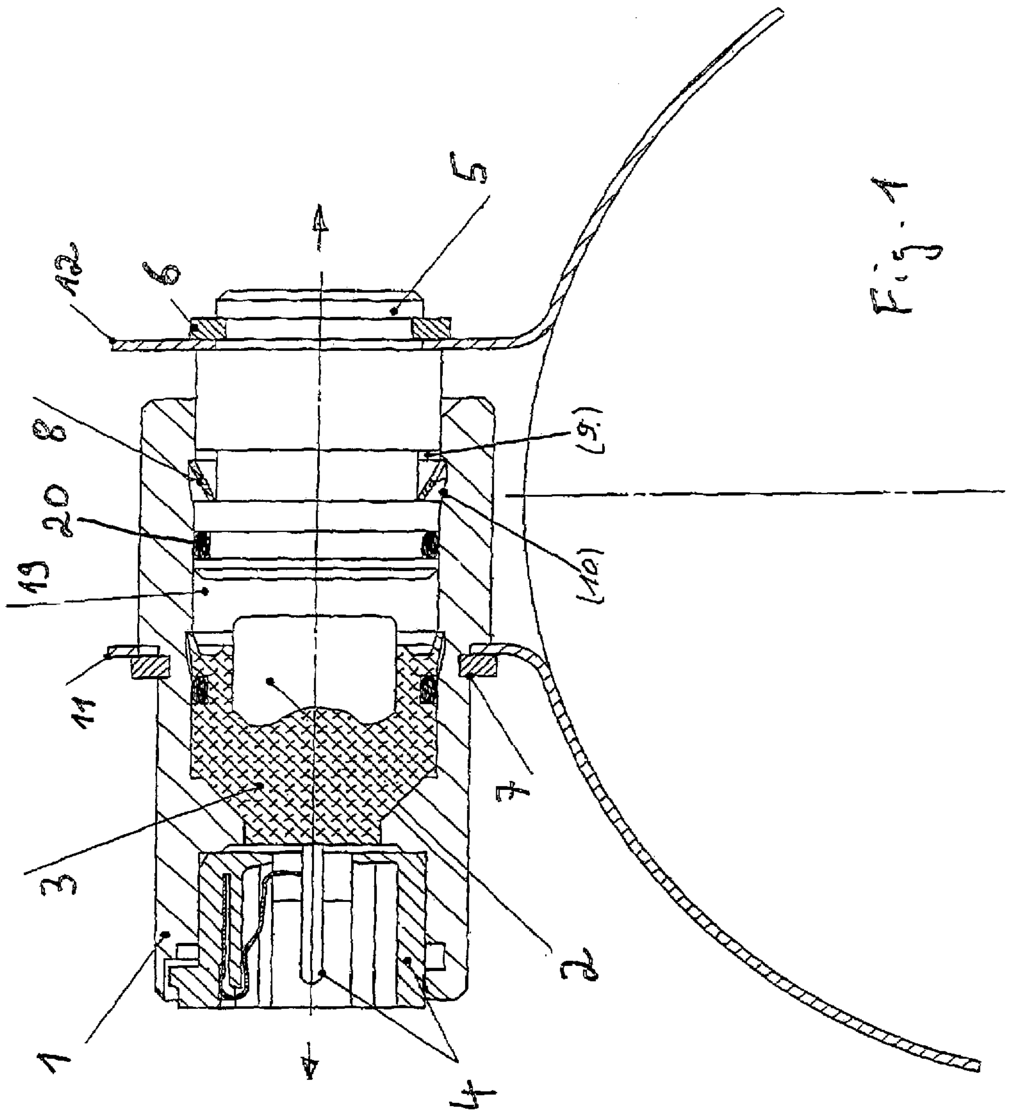
FIG. 1 shows an embodiment of a pyromechanical separating element with a plate spring with crown-shaped incisions as an arresting and force-limiting element.

The pyromechanical separating element substantially consists of the housing 1, into which the pyrotechnic pressure element 2 is inserted by way of an insulating body 3, the electrical connector system 4, the latching pin 5, the securing rings 6, 7 and the arresting and force-limiting element 8. This arresting and force-limiting element 8 can be constructed in different ways. In exemplary embodiment 1 (FIG. 1) this arresting and force-limiting element 8 is constructed as a plate spring with crown-shaped incisions. In the latched state this element sits in the latching-pin groove 9 and in the housing groove 10. If attempts are made to pull the latching pin 5 and the housing 1 apart, the arresting and force-limiting element 8 locks. Only after a force that is set by the spring tension of this element and by the geometrical shape of the arresting and force-limiting element 8 and the grooves 9, 10 has been overcome can the latching pin 5 be pulled out of the housing 1.

The two clip ends 11, 12, which are fixedly connected to the pyromechanical separating element, are held fast even in the case of mechanical loads that are high under normal conditions and seek to pull the clip together or apart. It is only in the case of intentional separation, for example as a result of emergency situations or overload situations, that an electric current-surge acts on the pyrotechnic pressure element 2 connected by way of the electrical connector system 4, the pyrotechnic pressure element 2 is ignited, and a driving pressure that is high as a result of the combustion of the pyrotechnic substance is generated in the driving volume 19, pressing, in turn, on the latching pin 5.

The force that results from the pressure and the area of the latching pin 5, when the holding force of the arresting and force-limiting element 8 is exceeded, is able to separate the latching pin 5 and the housing 1. The securing rings 6, 7 in this embodiment have to ensure that the two portions remain firmly fixed at the clip ends and cannot fly away.

During the separating process, the arresting and force-limiting element 8 is deformed in such a way that the edges of the housing groove 10 and the latching-pin groove 9 shear off the plate-spring crown elements.

Figure 2:
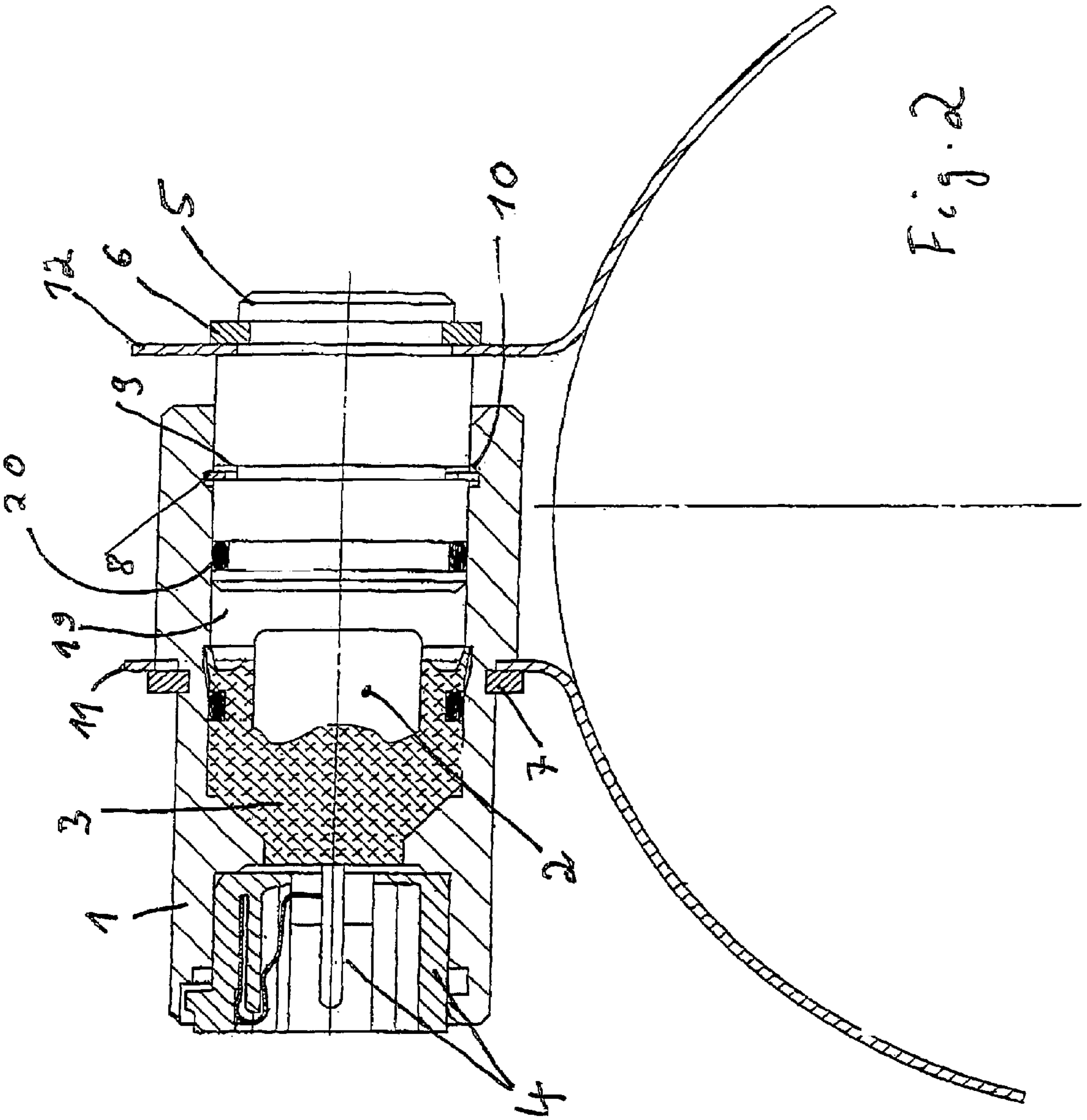
FIG. 2 shows an embodiment that is analogous to that of FIG. 1, yet with a sheet-metal ring as the arresting and force-limiting element.

In FIG. 2, the arresting and force-limiting element 8 is constructed as a sheet-metal ring. In the case of this element, when the resistance to the pulling-out action is overcome, direct punching of the sheet-metal ring is also achieved by way of the pulling-out force that results from the driving pressure of the pyrotechnic pressure element 2.

Figure 3:
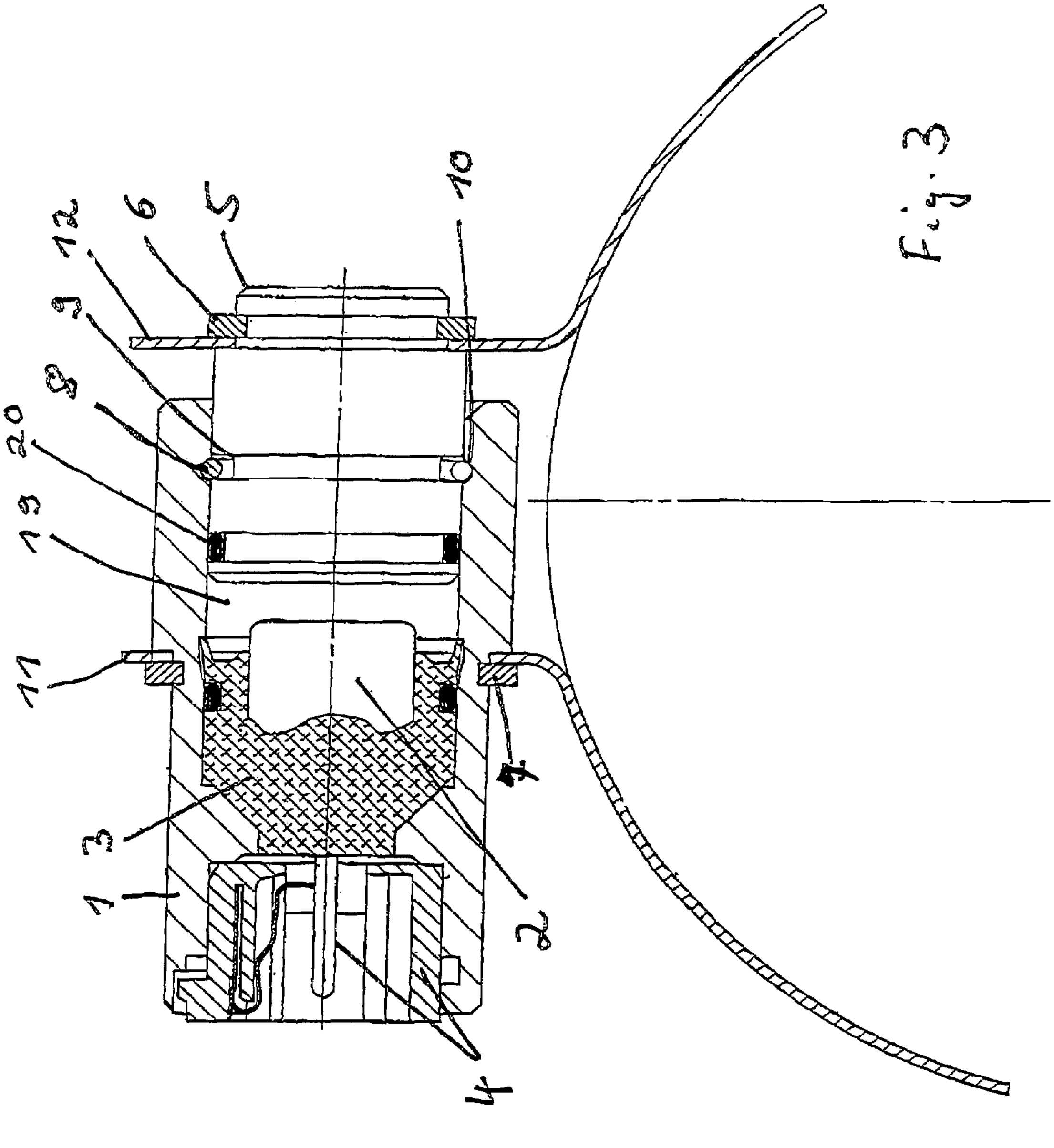
FIG. 3 shows an embodiment that is analogous to that of FIG. 1, yet with a spring ring as the arresting and force-limiting element.

FIG. 3 shows a further embodiment of the arresting and force-limiting element 8 as a spring ring. Here the spring tension and groove shape determine both the level of the holding force and that of the resistance to the pulling-out action.

After the housing 1 has been plugged together with the latching pin 5, in whose groove 9 the arresting and force-limiting element 8 is located, the latter snaps into the groove 10 that is provided in the housing 1 and blocks the extraction. The pyromechanical separating element can now be inserted into the clip ends 11, 12 and can be secured under compression by means of the securing rings 6, 7.

Figure 4:
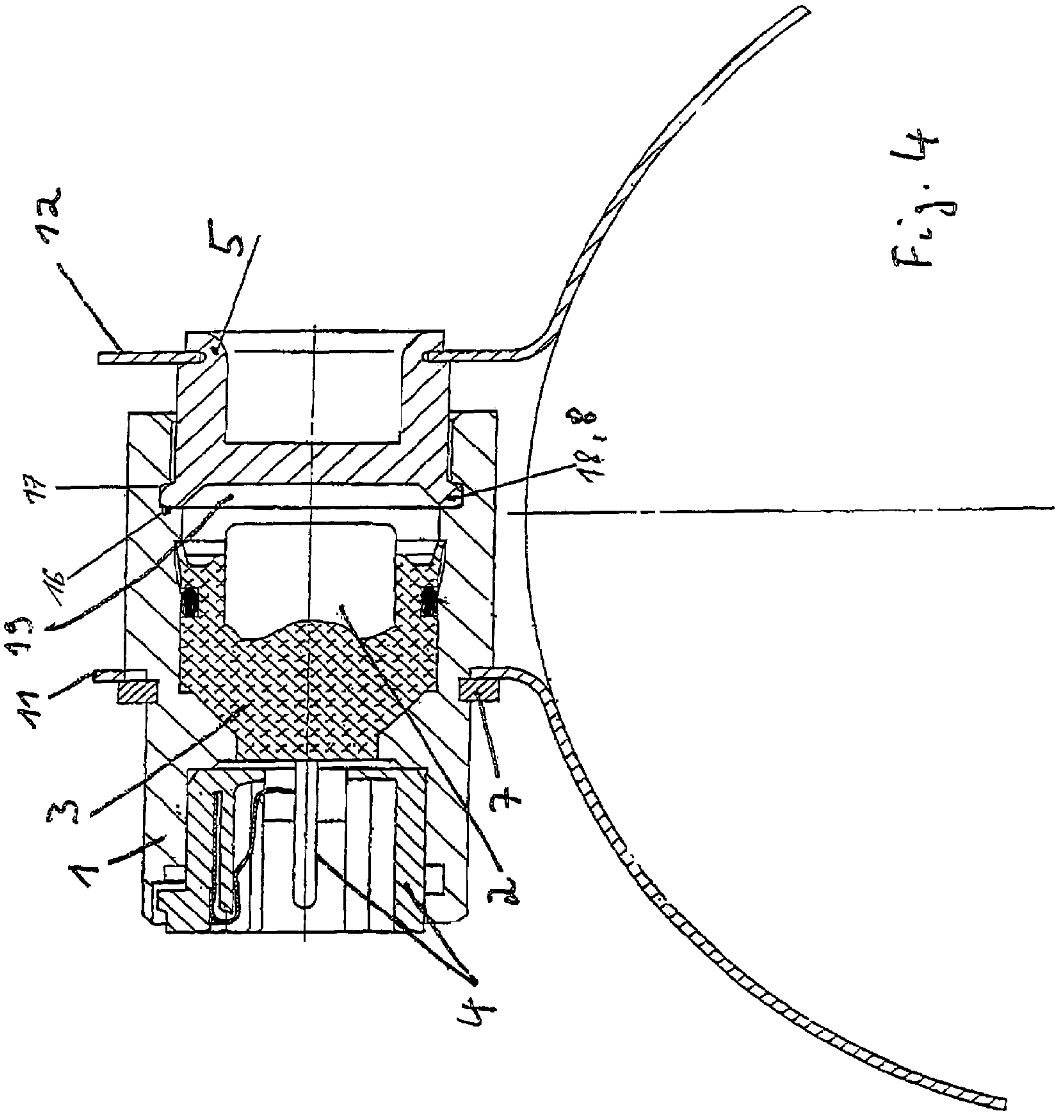
FIG. 4 shows an embodiment that is analogous to that of FIG. 1, yet with a radial projection on the latching pin as the arresting and force-limiting element.

Another embodiment of the separating element in accordance with the invention is shown in FIG. 4. The latching pin 5 is constructed in such a way that it presses against the shoulder of the housing groove 16 during assembly and then is deformed with a high force of pressure. This process in principle represents a kind of riveting. The form of the groove 17 and the projection 18 and the type of material construction allow different latching forces to be set. The projection 18 in this case represents the arresting and force-limiting element 8.

In order to seal the driving volume 19 it is advantageous to arrange on the outer circumference of the latching pin 5 a sealing ring 20 which is let into a groove. In the same way, a sealing ring should be arranged on the insulating body 3.

The invention claimed is:

1. Pyromechanical separating element having:

a hermetically sealed pyrotechnic pressure element, which is installed in a housing and has a gas-forming pyrotechnic charge, and a detachable latching pin which is separated from the pressure element by a driving volume and is inserted into the housing, wherein a first securing point is arranged on the housing and a second securing point is arranged on the latching pin, and the latching pin is anchored on the housing by way of an arresting and force-limiting element, and wherein activation of the pyrotechnic pressure element disrupts the arresting and force-limiting element so that the latching pin separates from the housing.

2. Separating element according to claim 1, characterised in that the arresting and force-limiting element is a plate spring which in the latched state sits both in a latching-pin grove in the latching pin and in a housing groove.

3. Separating element according to claim 1, characterised in that the arresting and force-limiting element is a sheet metal ring or a spring ring which in the latched state sits both in a latching-pin groove in the latching pin and in a housing groove.

4. Separating element according to claim 1, characterised in that the arresting and force-limiting element is a radial projection on the latching pin that engages into a housing groove on the housing.

5. Separating element according to claim 1, characterised in that arranged on the outer circumference on the latching pin there is a sealing ring which is let into a groove.

6. Separating element according to claim 2, characterised in that arranged on the outer circumference of the latching pin there is a sealing ring which is let into a groove.

7. Separating element according to claim 3, characterised in that arranged on the outer circumference of the latching pin there is a sealing ring which is let into a groove.

8. Separating element according to claim 4, characterised in that arranged on the outer circumference of the latching pin there is a sealing ring which is let into a groove.

9. Separating element according to claim 2, characterised in that plate spring has crown shaped incisions.

10. Separating element according to claim 1, characterised in that the arresting and force-limiting element is selected from the group consisting of a plate spring which in the latched state sits both in a latching-pin grove in the latching pin and in a housing groove, a sheet-metal ring or a spring ring which in the latched state sits both in a latching-pin groove in the latching pin and in a housing groove, and a radial projection on the latching pin that engages into a housing groove on the housing.

11. Separating element according to claim 1, characterized in that the driving volume comprises a gas.

* * * * *